United States Patent
Onishi et al.

(10) Patent No.: US 6,665,248 B1
(45) Date of Patent: Dec. 16, 2003

(54) APPARATUS AND METHOD FOR PLAYING BACK VOICE DATA FILE, AND RECORDING MEDIUM HAVING A PLAYBACK PROGRAM FOR PLAYING BACK A VOICE DATA FILE RECORDED THEREIN

(75) Inventors: Takafumi Onishi, Tama (JP); Hiroaki Miura, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/521,314

(22) Filed: Mar. 9, 2000

(30) Foreign Application Priority Data

Mar. 11, 1999 (JP) ............................................ 11-065252

(51) Int. Cl.[7] ................................................ G11B 7/00
(52) U.S. Cl. ................................ 369/53.41; 369/32.01; 369/47.54; 369/47.23
(58) Field of Search .......................... 369/32.01, 47.23, 369/47.1, 47.13, 47.54, 86, 83, 53.41, 47.11, 47.5, 53.1, 53.2, 53.22, 53.31, 59.25; 360/47, 27; 365/185.12, 230.03

(56) References Cited

U.S. PATENT DOCUMENTS

| | | | |
|---|---|---|---|
| 5,566,379 A | | 10/1996 | Mawatari et al. |
| 5,815,730 A | | 9/1998 | Kim |
| 6,208,802 B1 | * | 3/2001 | Mori et al. ............. 386/96 |
| 6,278,678 B1 | * | 8/2001 | Iida ........................ 369/83 |
| 6,385,690 B1 | * | 5/2002 | Iida et al. ............. 711/103 |
| 6,434,103 B1 | * | 8/2002 | Shitara et al. ......... 369/83 |

FOREIGN PATENT DOCUMENTS

| | | |
|---|---|---|
| EP | 0 676 895 A | 10/1995 |
| EP | 0 805 455 A | 11/1997 |
| JP | 8-124362 | 5/1996 |
| WO | WO 00 41178 A | 7/2000 |

OTHER PUBLICATIONS

Patent Abstracts of Japan, vol. 1996, No. 09, Sep. 30, 1996 & JP 08 124362 A (Soncy Corp.), May 17, 1996.

* cited by examiner

Primary Examiner—Ali Neyzari
(74) Attorney, Agent, or Firm—Frishauf, Holtz, Goodman & Chick, P. C.

(57) ABSTRACT

A voice file consists of a plurality of data blocks. Each data block is composed of a plurality of sectors. Playback time information on voice data recorded in the sector is stored in the sector header. A control device creates a management file having the playback time for each block recorded therein from the information on this sector header, and stores it in a RAM or storage medium. When an arbitrary playback time is specified by an input device, which of the data blocks having the specified playback time positioned therein is retrieved by referring to this management file. Then, the playback times of voice data in sectors are calculated sequentially from the first sector of the data block. A sector in which a sum between the calculated playback time and a playback time up to a data block immediately preceding the retrieved data block is coincident with the specified playback time is retrieved, and access to the sector is provided.

18 Claims, 11 Drawing Sheets

FIG. 1

| | | MANAGEMENT FILE 111 | | |
|---|---|---|---|---|
| REGISTRY NO. 1 | | DSS_FILE_NUM | DWORD | NUMBER OF REGISTERED DDS FILES |
| | DSS_CHANK (DSS FILE 1) | CHAR | DSS | ASCII CODE INDICATIVE OF BEGINNING OF DSS FILE |
| | | CHAR | | |
| | | CHAR | | |
| | DSS_INFO | WORD | | JOB NUMBER (BINARY) |
| | | CHAR*6 | | RECORDING LENGTH (ASCII) hhmmss |
| | | CHAR*6 | | DATE OF RECORDING (ASCII) yymmdd |
| | | CHAR*6 | | RECORDING TIME (ASCII) hhmmss |
| | DSS_QUALITY | BYTE | | SOUND QUALITY INFORMATION (BINARY) |
| | DSS_BLOCK_NUM | WORD | | NUMBER OF REGISTERED BLOCKS (n) |
| | DSS_BLOCK_DATA | DWORD | | MILLISECONDS IN BLOCK 1 (BINARY) |
| | | DWORD | | MILLISECONDS IN BLOCK 2 (BINARY) |
| | | : | | : |
| | | DWORD | | MILLISECONDS IN BLOCK (n) (BINARY) |
| REGISTRY NO. 2 | DSS_CHANK (DSS FILE 2) | CHAR | DSS | ASCII CODE INDICATIVE OF BEGINNING OF DSS FILE INFORMATION |
| | | CHAR | | |
| | | CHAR | | |
| | | WORD | | |

(CHAR:8BIT, BYTE:8BIT, WORD:16BIT, DWORD:32BIT)

FIG. 3B  SH:SECTOR HEADER

APPARATUS AND METHOD FOR PLAYING BACK VOICE DATA FILE, AND RECORDING MEDIUM HAVING A PLAYBACK PROGRAM FOR PLAYING BACK A VOICE DATA FILE RECORDED THEREIN

CROSS-REFERENCE TO RELATED APPLICATION

This application is based upon and claims the benefit of priority from the prior Japanese Patent Application No. 11-065252, filed Mar. 11, 1999, the entire contents of which are incorporated herein by reference.

BACKGROUND OF THE INVENTION

The present invention relates to a playback apparatus and method for playing back a voice data file, and a recording medium for recording a playback program causing a computer to perform an operation for playing back the voice data file recorded therein.

Conventionally, there is known a playback apparatus in which a voice input from a microphone is converted into digital data; voice compression processing is applied; a voice data file is recorded in a recording medium; the voice data file recorded in this recording medium is read out; expansion processing is applied; the voice data is converted into analog voice information; and a voice is output from a speaker or the like.

Here, in a voice data file, there is a case that the file has a long time interval such as some tens of minutes. In order to enhance data accessibility of such relatively long file, the data having a data address corresponding to a playback time (counter information) is required.

To solve this, in Jpn. Pat. Appln. KOKAI Publication No. 8-124362, the corresponding table is created at the header portion of each track of each data file. That is, in a playback apparatus disclosed in this specification, a management file includes data on the start and stop addresses of each data file, and the data having the data address corresponding to the playback time (counter information) is included in every track of each data file.

However, in the case of a jump to an arbitrary time position of a file, in the playback apparatus disclosed in the above specification, it is required to check each of the corresponding tables created at the header portion of each track and calculate a time, which is time consumable and disables fast access.

BRIEF SUMMARY OF THE INVENTION

The present invention has been achieved in view of the foregoing circumstance. It is an object of the present invention to provide a playback apparatus and method in which fast data access is feasible in the case of a jump to an arbitrary time position of a file.

According to a first aspect of the present invention, there is provided a playback apparatus for playing back a voice data file, wherein the voice data file comprises a plurality of blocks and a file header being management information on the voice data file, the blocks each contain a plurality of sectors and a block header being management information on the block, and the sectors contain voice data and a sector header being management information on the sector, the apparatus comprising:

calculation means for calculating a playback position from a start position of the voice data file by each block;

management file creation means for creating a management file for managing a playback position from a start position of the voice data file of each block; and storage means for storing the management file.

According to a second aspect of the present invention, there is provided a recording medium having a playback program for playing back a voice data file recorded therein, the voice data file containing a plurality of blocks and a file header being management information on the voice data file, the blocks each containing a plurality of sectors and a block header being management information on the block, the sectors each containing voice data and a sector header being management information of the sector, the playback program causing a computer to perform operations for:

calculating the playback position from the start position of the voice data file by each block;

creating a management file for managing the playback time from the start position of the voice file of each block; and storing the management file in a storage medium for storing voice data.

According to a third aspect of the present invention, there is provided a method for playing back a playback apparatus for playing back a voice data file, the voice data file containing a plurality of blocks and a file header being management information on the voice data file, the blocks each containing a plurality of sectors and a block header being management information on the block; the sectors each containing voice data and a sector header being management information on the sector, the method comprising the steps of:

calculating the playback position from the start position of the voice data file by each block;

creating a management file for managing the playback position from the start position of the voice data file in each block; and storing the management file in a storage medium for storing voice data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE INVENTION

Hereinafter, embodiments of the present invention will be described with reference to the accompanying drawings.

First Embodiment

Figure 1:
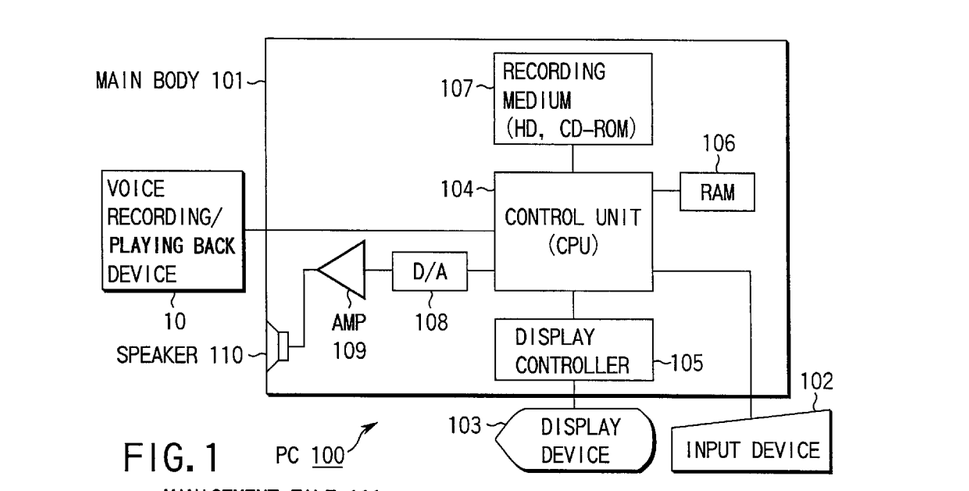
FIG. 1 is a block diagram showing a configuration of a voice processing system to which a playback apparatus according to a first embodiment of the present invention is applied.

FIG. 1 is a diagram showing a configuration of a voice processing system to which a playback apparatus according to a first embodiment of the present invention is applied. This voice processing system is composed of a voice recording/playing back device 10 and a personal computer (PC) 100.

The voice recording/playing back device 10 is capable of converting the voice input from a microphone into a digital signal; compressing the digital signal; and recording (storing) the compressed signal as a voice data file in a fixedly or detachably incorporated voice recording medium (a storage medium) (not shown). In the present embodiment, a voice data file whose format is based on the Digital Speech Standard suitable to dictation is handled as an example of voice data file, and uses ".dss" for extension. Hereinafter, the voice data file whose format conforms to the above standard is referred to as a DSS file. In addition, this voice recording/playing back device 10 is capable of reading out a voice data file from the above voice recording medium; expanding the file; converting it into an analog signal; and outputting the converted signal as a voice from a speaker.

On the other hand, the PC 100 is configured by connecting an input device 102 such as keyboard or mouse and a display device 103 such as CRT display or liquid crystal display to a main body 101. The main body 101 of this PC 100 incorporates: a control unit (CPU) 104 for controlling the entire PC; a display controller 105 for controlling a display on the above display device 103; and a RAM 106 utilized as a work area for the above control device 104 to perform operation as described later; a storage medium 107 such as hard disk (HD) or CD-ROM drive; and a voice playback mechanism consisting of a digital/analog converter (D/A) 108, an amplifier 109, and a speaker 110. The control device 104 is connected to the above voice recording/playing back device 10 via wire or wirelessly. Then, the control device fetches a voice data file recorded in a voice recording medium incorporated therein into the storage medium 107 of the PC 100, and reads out the file according to a playing back instruction using an input device 102 by an operator. Further, the D/A 108 converts it into an analog voice signal, and the amplifier 109 amplifies the converted signal. The amplified signal can be output as a voice from the speaker 110.

Of course, in the case where the voice recording medium of the voice recording/playing back device 10 is detachable, the detached voice recording medium is set to a recording medium driving device (not shown) provided at the main body 101 so that the voice data file recorded from the voice recording medium may be fetched.

Figure 2:
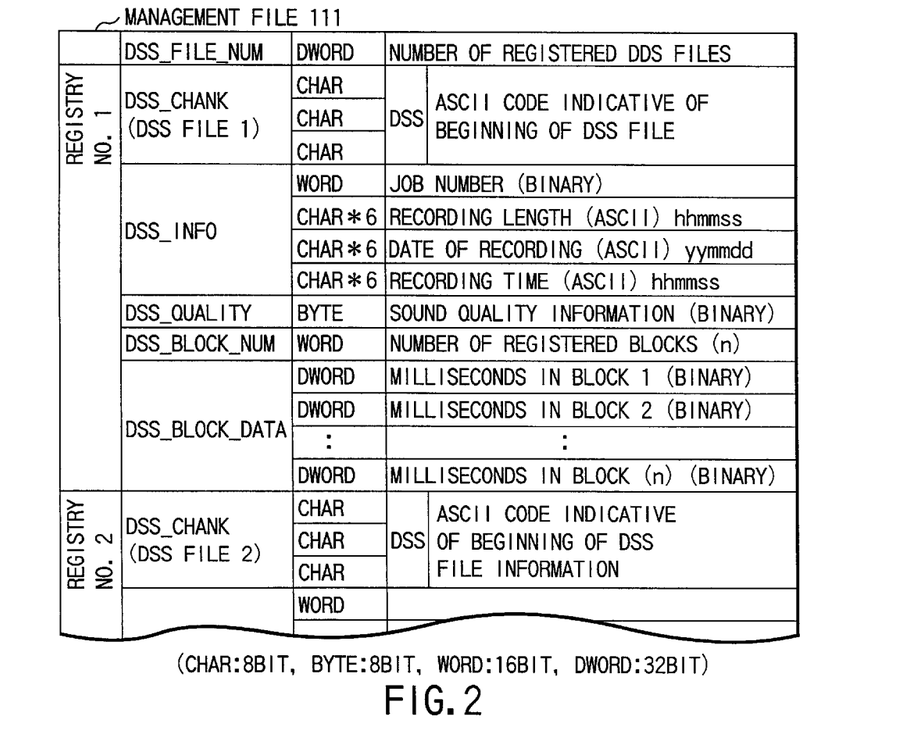
FIG. 2 is a diagram showing a configuration of a management file.

In the present embodiment, when the voice data file has been fetched or when a voice processing program as described later is executed, the management file 111 as shown in FIG. 2 is created in the RAM 106 or storage medium 107. The creation processing of this management file 111 will be described in detail.

In this management file 111, as illustrated, a DSS_FILE_NUM entry is arranged in a 32-bit area from a head address of the management file 111. This area is provided for storing the number of DSS files fetched in the storage medium 107.

Following this DSS_FILE_NUM entry, the areas for DSS_CHANK entry, DSS_INFO entry, DSS_QUALITY entry, DSS_BLOCK_NUM entry, and DSS_BLOCK_DATA entry are arranged in order by each DSS file.

The DSS_CHANK entry includes three 8-bit areas, and an ASCII code indicative of the start of DSS file information is stored therein. That is, an ASCII code indicative of character "D" is written in a first 8-bit area; and ASCII codes, each of which is indicative of character "S", are written in second and third 8-bit areas, respectively.

The DSS_INFO entry includes a 16-bit area for storing a JOB number and three areas indicating a recording length, date of recording, and a recording time by 8×6 bits, respectively. The data stored therein is recorded by copying the information written in advance in a file header of the DSS file.

Figure 3A:
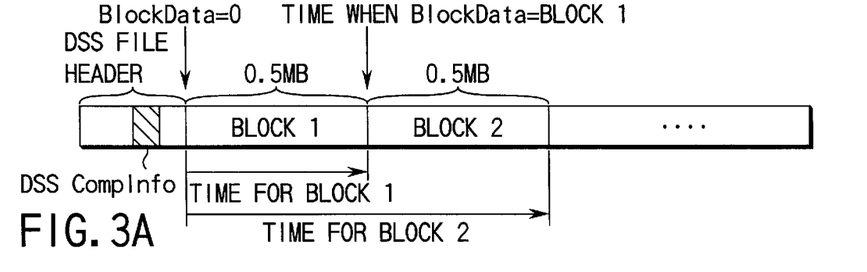
FIG. 3A is a diagram showing a configuration of a DSS file.

That is, the DSS file, as shown in FIG. 3A, is composed of a DSS file header arranged at the head of the DSS file and a plurality of blocks for storing actual voice data. The information stored in this DSS_INFO entry is stored in the DSS file header (hereinafter, referred to as "DSSCompInfo). That is, in the DSSCompInfo, a JOB number is a serial number (binary data) automatically assigned during recording in order to identify the DSS file by the voice recording/playing back device 10. In addition, the data on recording length, date of recording, and recording time is produced by the voice recording/playing back device 10 during recording, and is recorded as ASCII codes.

Figure 3B:
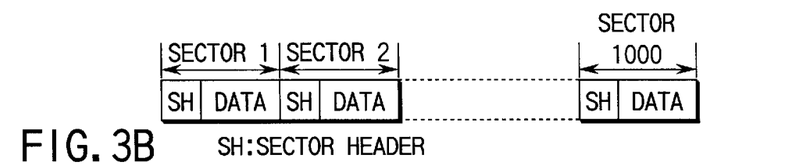
FIG. 3B is a diagram showing a block configuration.
Figure 3C:
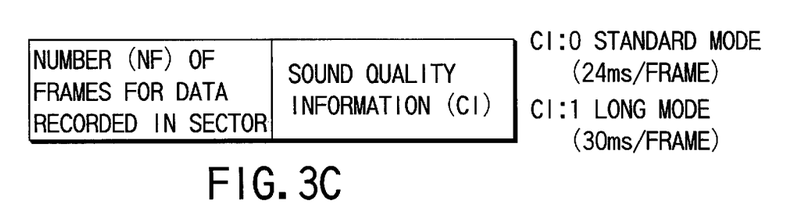
FIG. 3C is a diagram showing a sector configuration.

DSS_QUALITY entry is 8-bit information for identifying the sound quality of the DSS file. That is, in the voice recording/playing back device 10, voice data can be recorded with two types of quality such as high and low quality of sound by changing parameters such as sampling frequency or compression ratio, for example. In the case of low quality recording, the data quantity is decreased accordingly, and data can be recorded by longer time intervals than in the case of high quality recording. The DSS file, as shown in FIG. 3A, includes a plurality of blocks partitioned by each 0.5 MB. These blocks are further divided into 1000 sectors as shown in FIG. 3B, and high or low quality of sound can be switched by each sector. Thus, each sector comprises a sector header SH and a data area. The sector header SH, as shown in FIG. 3C, is adopted to store the number NF of frames for data recorded in the sector and sound quality information CI thereon. The sound quality information CI is written as "0" during standard mode for high sound quality, and is written as "1" during long mode for low sound quality. Therefore, the DSS_QUALITY entry of this management file 111 stores information indicating that the DSS file is in standard mode, long mode, or their coexisting mode based on the sound quality information CI of each of these sectors.

DSS_BLOCK_NUM entry is a 16-bit area for storing the number of blocks contained in the DSS file.

The DSS_CHANK entry, DSS_INFO entry, DSS_QUALITY entry, and DSS_BLOK_NUM entry as described above are fixed length data.

In contrast, DSS_BLOCK_DATA entry stores the time for each block as 32-bit data, whereby the data length of the entire DSS_BLOCK_DATA entry is changed according to the number of blocks.

The time for each block denotes a time (milliseconds) from the beginning of block 1 after the file header to the end of the block, and does not denote the time of block itself. The time for this block can be obtained by multiplying the number NF of frames recorded in the sector header SH by 24 ms in standard mode or 30 ms in long mode, thereby calculating the time for each sector, and then, accumulating the time for each sector. That is, even if each block is equal to 0.5 MB in data size, the recording time differs depending on any one of the standard mode, long mode, and their coexisting mode.

Figure 4:
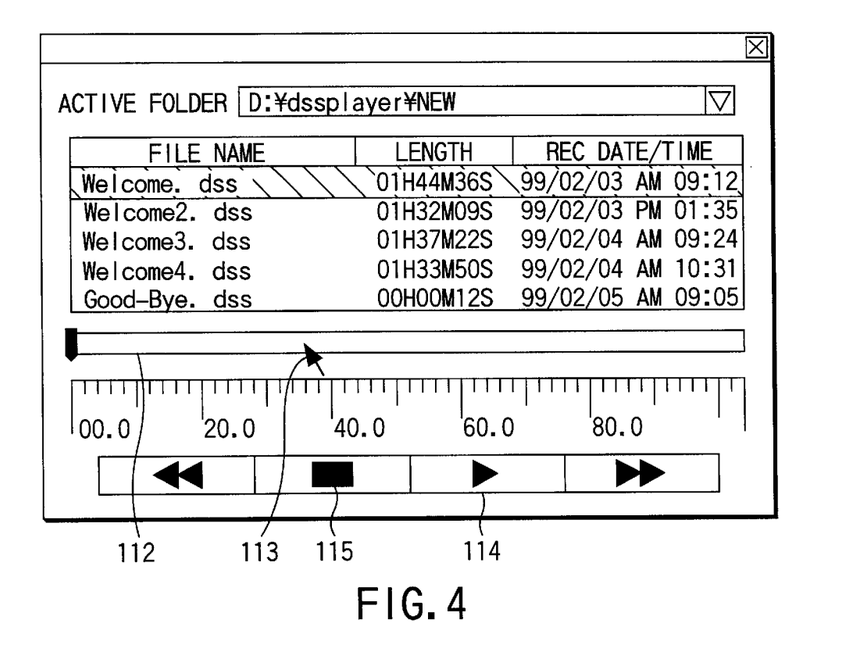
FIG. 4 is a diagram showing a display screen when a voice processing program is executed.

FIG. 4 is a diagram showing a display screen when a voice processing program is executed. In the voice processing program, an instruction for selecting or playing back a DSS file can be executed by mouse operation of the input device 102. In addition, during DSS file playback, a mouse pointer 113 is moved to an arbitrary position of a time bar 112, and predetermined skipping operation such as clicking operation is performed, thereby making it possible to playback a voice of a time position (a skipping time position) corresponding to the specified position. That is, the voice processing program functions as access operating means. A jump to the skipping time position will be described later in detail.

Figure 5:
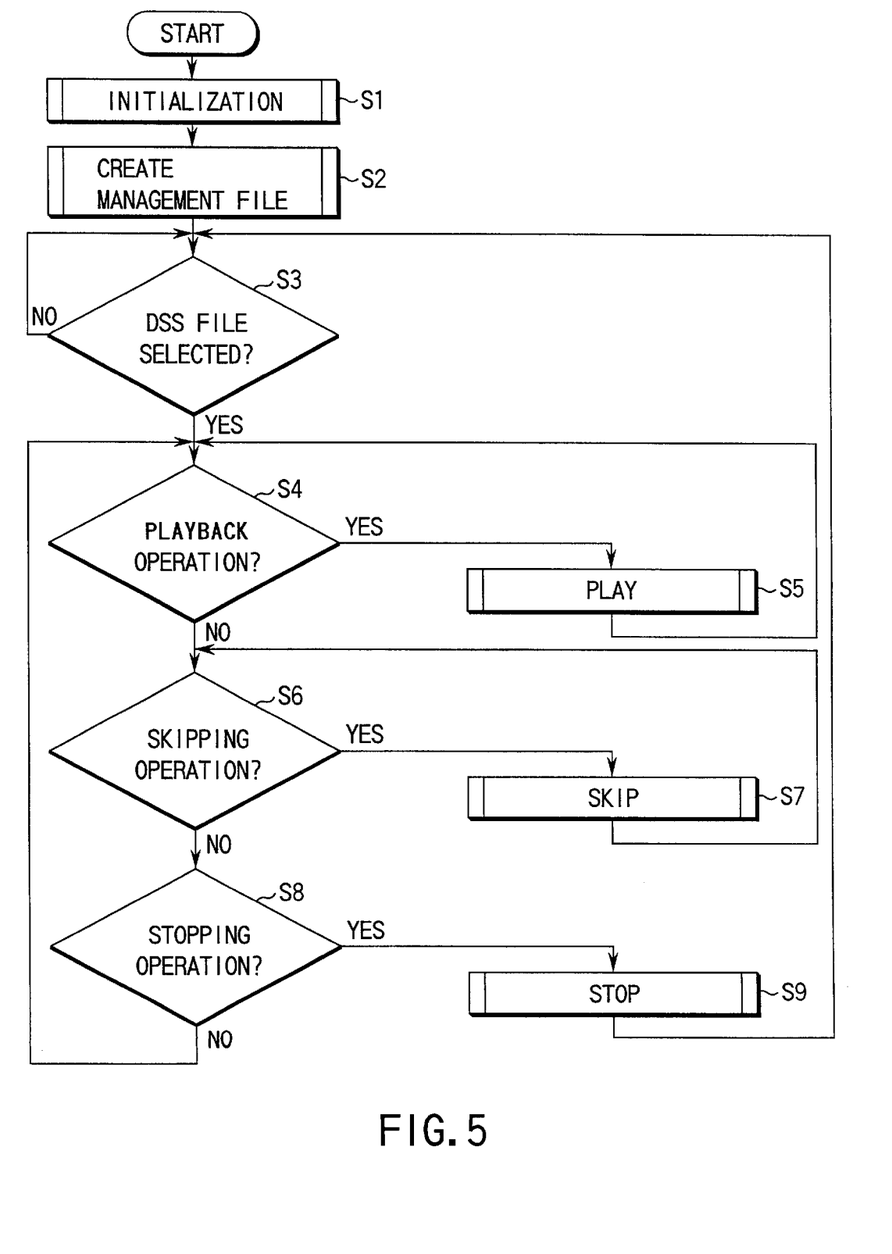
FIG. 5 is a flowchart showing a main operation of the voice processing program to be executed by a control device for the purpose of illustrating an operation of the first embodiment.

FIG. 5 is a flowchart showing a main operation of the voice processing program executed by the control device (CPU) 104. That is, the control device 104 first performs initialization according to an instruction for the user to execute the voice processing program (step S1). Then, it performs management file creation processing, and creates a management file 111 in the RAM 106 or the storage medium 107 (step S2). That is, the control device 104 functions as the management file creating means.

Thereafter, the control device waits for the user to select a DSS file to be played back (step S3). After the file has been selected, if predetermined playback operation such as mouse clicking operation of the playback button 114 is made (step S4), playback processing (PLAY processing) of the selected DSS file is performed (step S5). The PLAY processing is similar to conventional processing, and thus, a description thereof will be omitted here.

In the case where the skipping operation as described previously is made (step S6), the skip processing (SKIP processing) as described later is performed, and the voice at the specified SKIP time is played back (step S7). When predetermined stopping operation such as mouse clicking of a stop button 115 is made (step S8), stop processing (STOP processing) is performed to stop voice playback (step S9). Although not shown in particular, in the case where skipping operation is made during the PLAY processing, SKIP processing similar to that in step S7 is executed.

Figure 6:
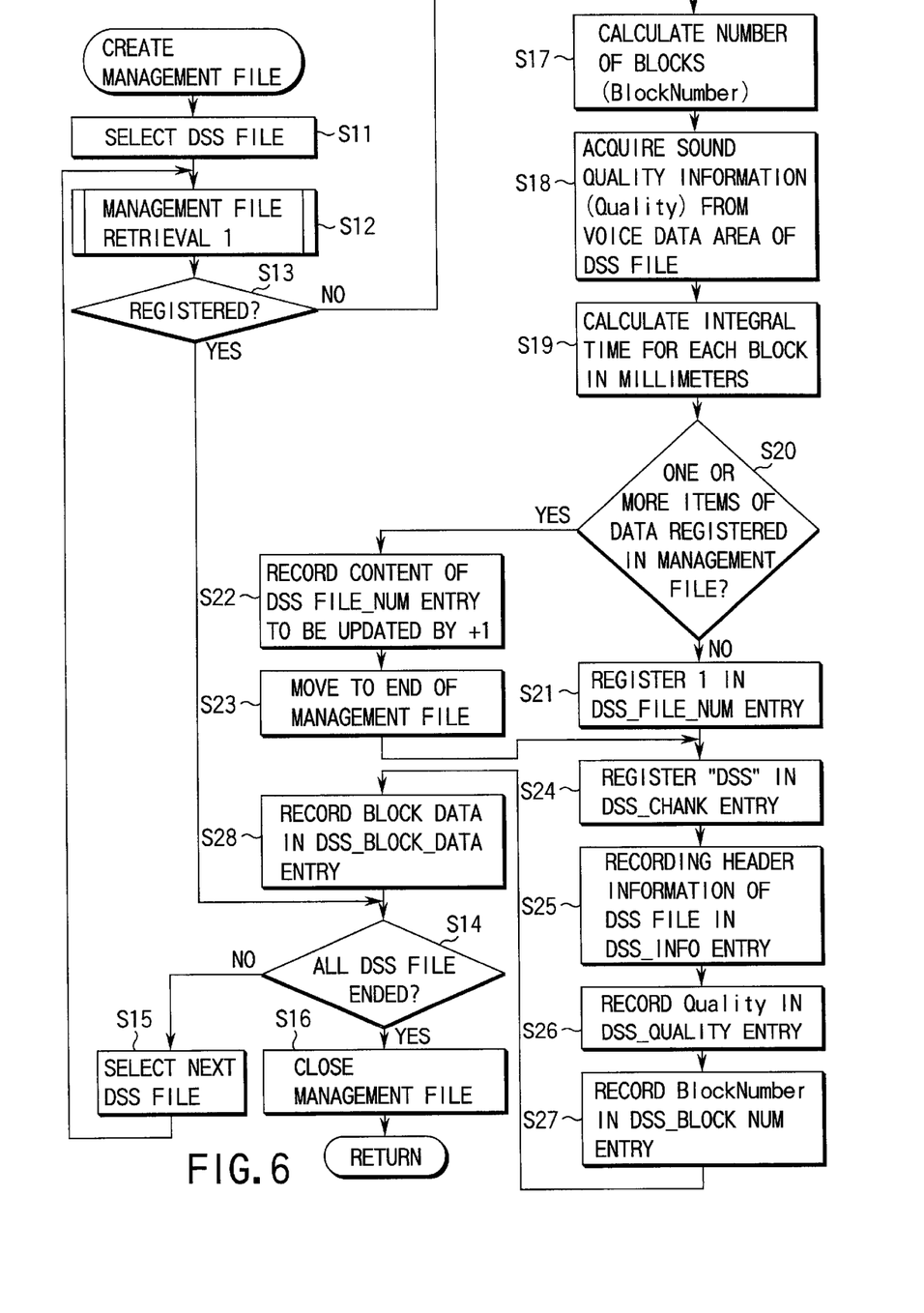
FIG. 6 is a flowchart for illustrating the details on management file creation processing shown in FIG. 5.

FIG. 6 is a flowchart showing management file creation processing executed in step S2.

That is, one DSS file is first selected as a processing target from a plurality of DSS files stored in the storage medium 107 such as hard disk (step S11). Then, management file retrieval (No. 1) processing is executed to check whether or not management information corresponding to the DSS file is registered in the management file 111 (step S12).

Figure 7:
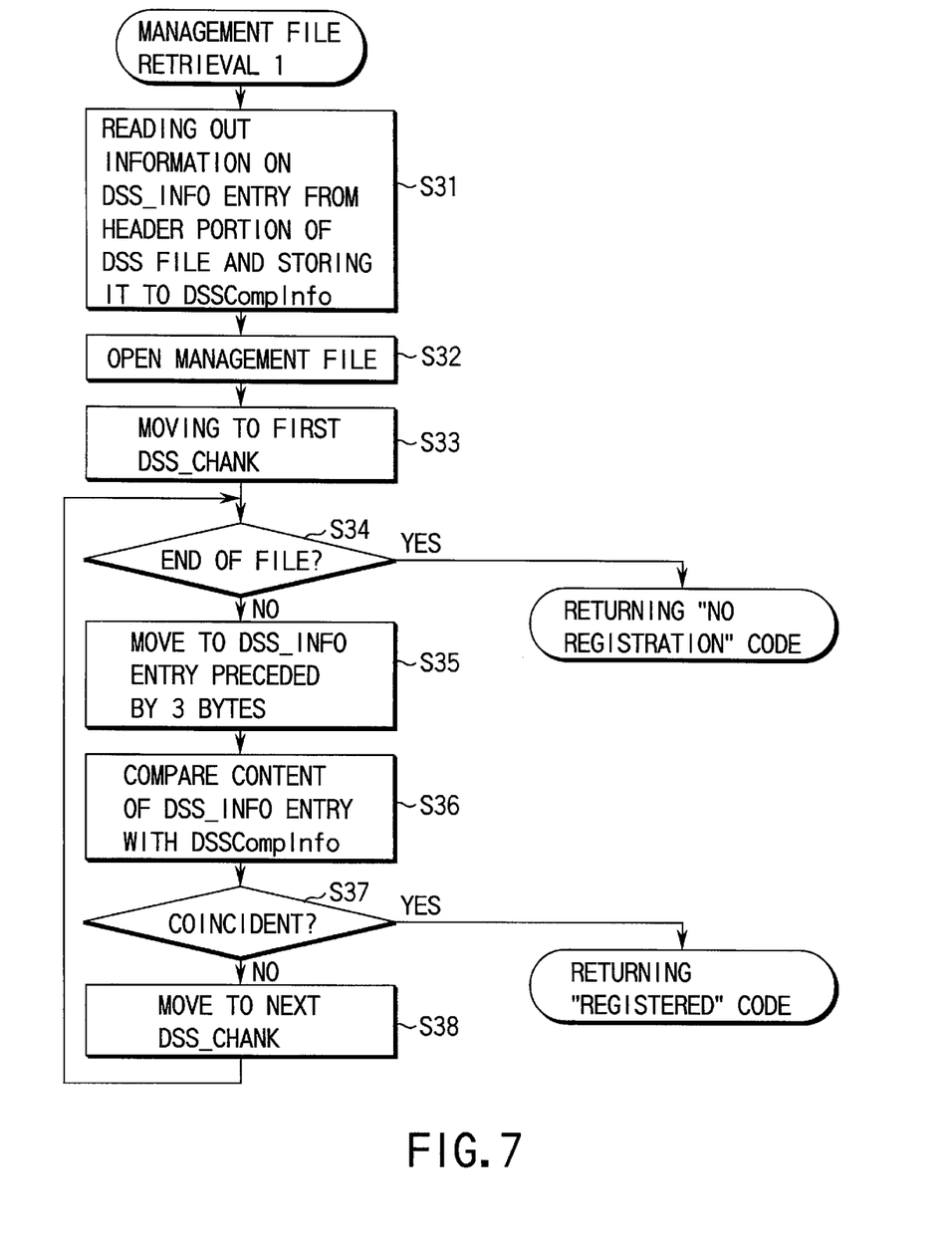
FIG. 7 is a flowchart for illustrating the details on management file retrieval (No. 1) processing shown in FIG. 6.

The management file retrieval (No. 1) processing, as shown in FIG. 7, first reads out the information on DSS-CompInfo corresponding to information on DSS_INFO entry of the management file 111 from the header portion of the DSS file. Then, the processing stores the information in the variable register DSSCompInfo (not shown) configured in the control device 104 or RAM 106 (step S31). The management file 111 configured in the RAM 116 or storage medium 107 is opened (step S32), and an internal address pointer indicative of a processing target of the control device 104 is moved to the DSS_CHANK entry of the DSS file of registry No. 1 in the management file 111 (step S33). At this time, when an address of a move destination is at the end of the management file 111 (step S34), the processing returns to a high-order routine, together with a "no registration" code indicating that the DSS file is not registered in the management file 111.

On the other hand, in the case where a string of three characters "DSS" indicative of a DSS file is stored from an address of a move destination, namely, in the case where such string is not at the end of the management file 111 (step S34), the internal address pointer is moved to the DSS INFO entry preceded by three bytes (step S35). Then, the content of the DSS_INFO entry is compared with the content of the variable register DSSCompInfo (step S36). When these contents are coincident with each other (step S37), the processing returns to the high-order routine together with a "registered" code indicating that the DSS file has been registered in the management file 111.

In the case where these contents are not coincident with each other, the internal address pointer is moved to the next DSS_CHANK entry (step S38), and the processing returns to step S34. In this manner, comparison with management information of the DSS file of the next registry No. will be performed.

Moreover, in the case where it is judged that management information has already been registered by the "no registration" code or "registered" code as a result of such management file retrieval (No. 1) processing (step S13), it is judged whether or not processing has been terminated for all the DSS files stored in the storage medium 107 (step S14). If a DSS file is not processed, the next DSS file of the currently processed DSS file is selected as a processing target (step S15), and the processing returns to step S12. In addition, in the case where it is judged that processing has been terminated for all the DSS files, the management file 111 is closed (step S16), and the processing returns to the aforementioned main operation flowchart.

In contrast, in step S13, in the case where it is judged that the management information is not registered, the number of blocks configuring the DSS file is first calculated. Then, the calculation results are stored in a variable register Block-Number (not shown) configured in the control device 104 or RAM 106 (Step S17). The number of blocks is equal to a quotient obtained when a value obtained by reducing the file header size from the file size of the DSS file is divided by 0.5 M, namely 500,000. If any remainder is produced, it is calculated by adding +1 to the quotient.

Next, sound quality information is acquired from the voice data area for the DSS file, namely, from each sector header SH. Then, information indicating that the DSS file is active in any one of the standard mode, long mode, and their coexisting mode is stored in a variable register Quality (not shown) configured in the control device 104 or RAM 106 (step S18). That is, the standard mode, long mode, or their coexisting mode allows 0, 1, or 2 to be stored in the variable register Quality, respectively. These "0", "1", and "2" are decimal numbers, and are actually 8-bit binary data. "00000000 ", "00000001", and "00000010 " are stored.

The time for each block is calculated in milliseconds according to the information on each of the selector headers SH, and the results are stored in the variable register (not shown) configured in the control device 104 or RAM 106 (step S19). The time for each block denotes the time from the beginning of block 1 as described previously.

Thereafter, it is judged whether or not the management information on one or more DSS files has been registered in the management file 111 (step S20). If no file is registered, "1" is registered in the DSS_FILE_NUM entry for storing the number of registered DSS files (step S21). In the case where the management information on one or more DSS files has already been registered, the content of the DSS_FILE_NUM entry is updated to be recorded by +1 (step S22), and then, the internal address pointer is moved to the end of the management file 111 (step S23).

After a character string "DSS" has been recorded in the DSS_CHANK entry (step S24), the information read out during management file retrieval (No. 1) processing in step S12 and stored in the variable register DSSCompInfo is recorded in the DSS_INFO entry (step S25). Thereafter, the content of the variable register Quality is recorded in the DSS_QUALITY entry (step S26). In addition, the content of the variable register "BlockNumber" is recorded in DSS_BLOCK_NUM (step S27). Further, the time for each block calculated and stored in step S19 is recorded in DSS_BLOCK_DATA entry (step S28).

Thus, when registration into the management file 111 has been completed, the processing proceeds to step S14. If the next DSS file is present, processing for that file is continued.

Figure 8A:
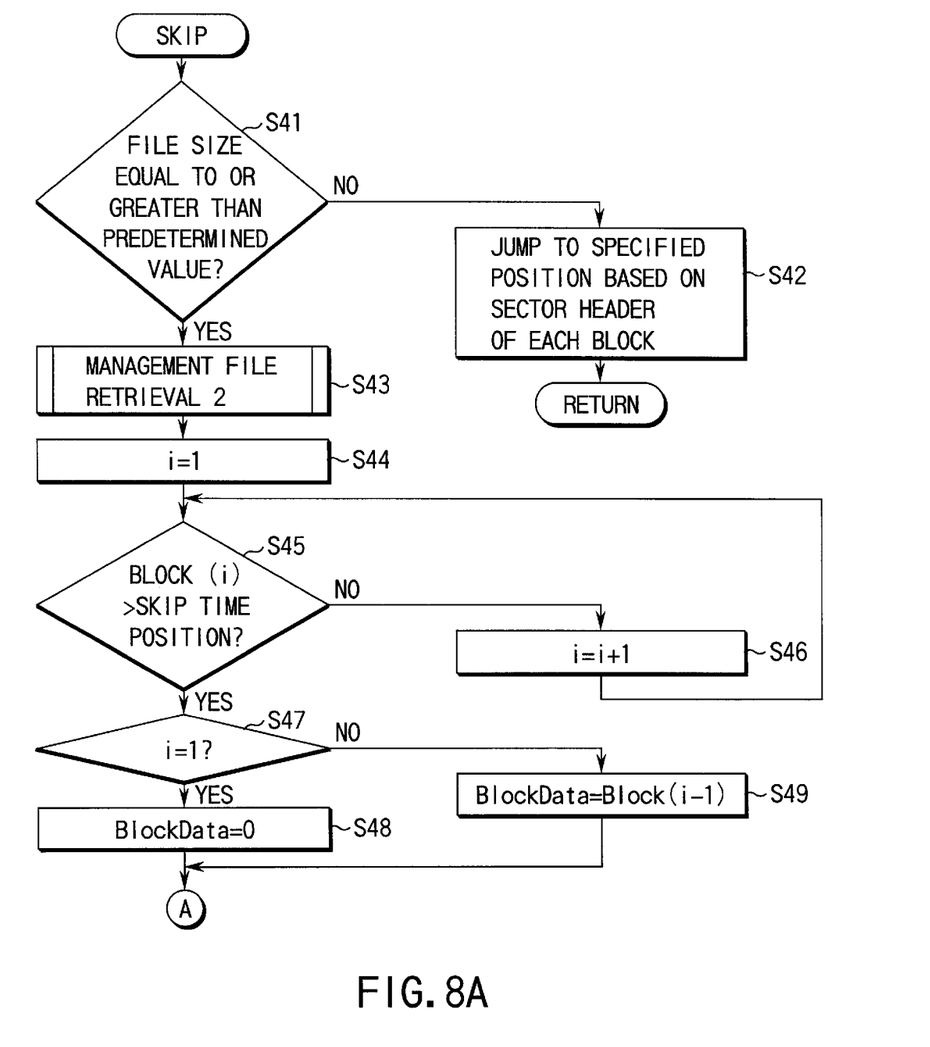
FIG. 8A is a diagram showing a first-half portion of a series of flowcharts for illustrating the details on skip processing shown in FIG. 5.
Figure 8B:
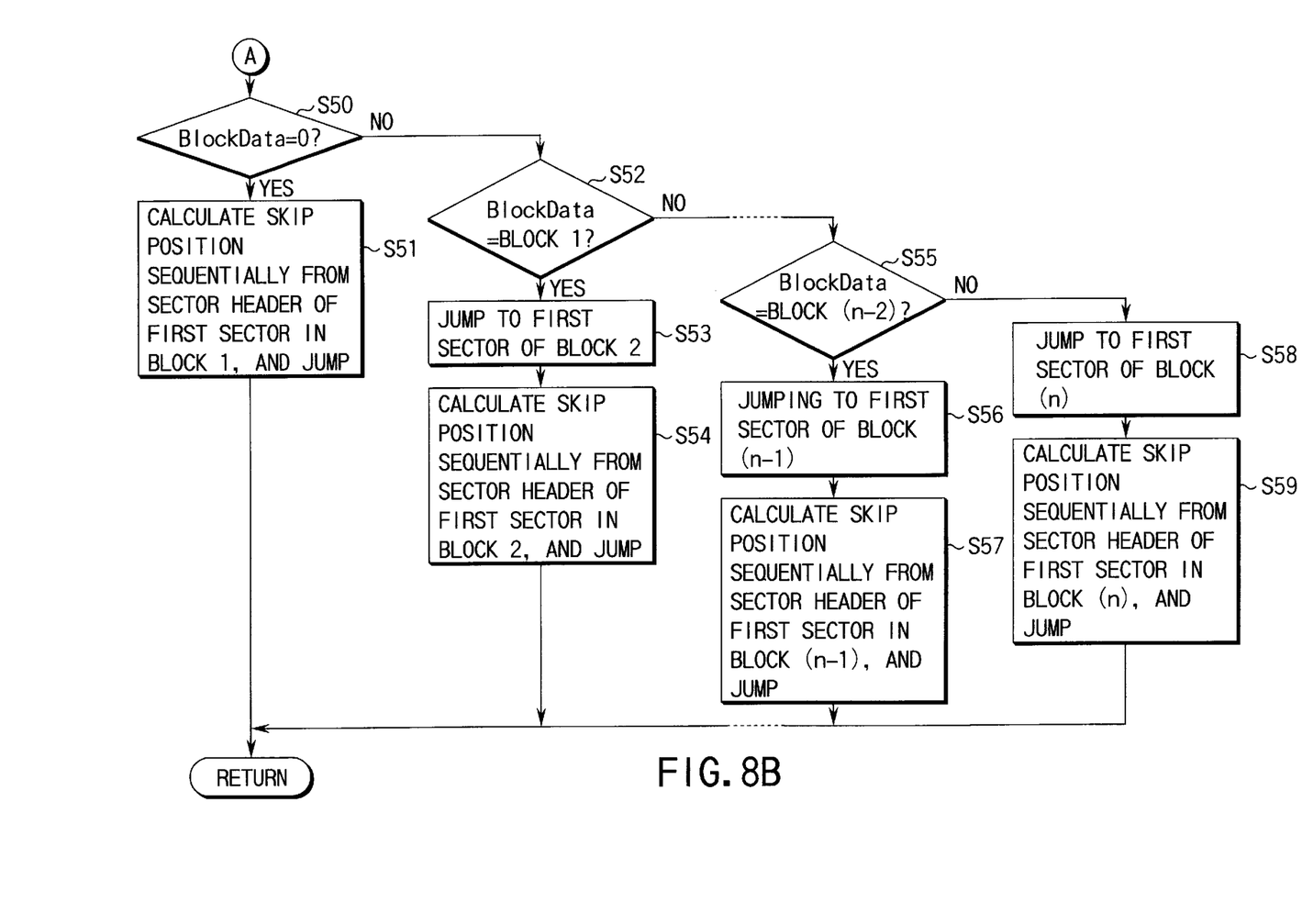
FIG. 8B is a diagram showing a latter-half portion of a series of flowcharts for illustrating the details on skip processing shown in FIG. 5.

The SKIP processing executed in step S7 is performed according to a series of flowcharts shown in FIGS. 8A and 8B.

That is, it is judged whether or not the file size of the selected file is equal to or greater than a predetermined value (step S41). Otherwise, the processing jumps to the specified position based on the sector header SH by each block (step S42). Namely, in the case where a file size is small such that it does not take much time even if times are calculated in order from the sector header SH by each block, processing similar to the conventional processing is performed. The predetermined value denotes a size equivalent to 30 minutes, for example.

In contrast, in the case where a file size is equal to or greater than the predetermined value, management file retrieval (No. 2) processing is performed, and the management information corresponding to the DSS file is retrieved from the management file 111 (step S43).

Figure 9:
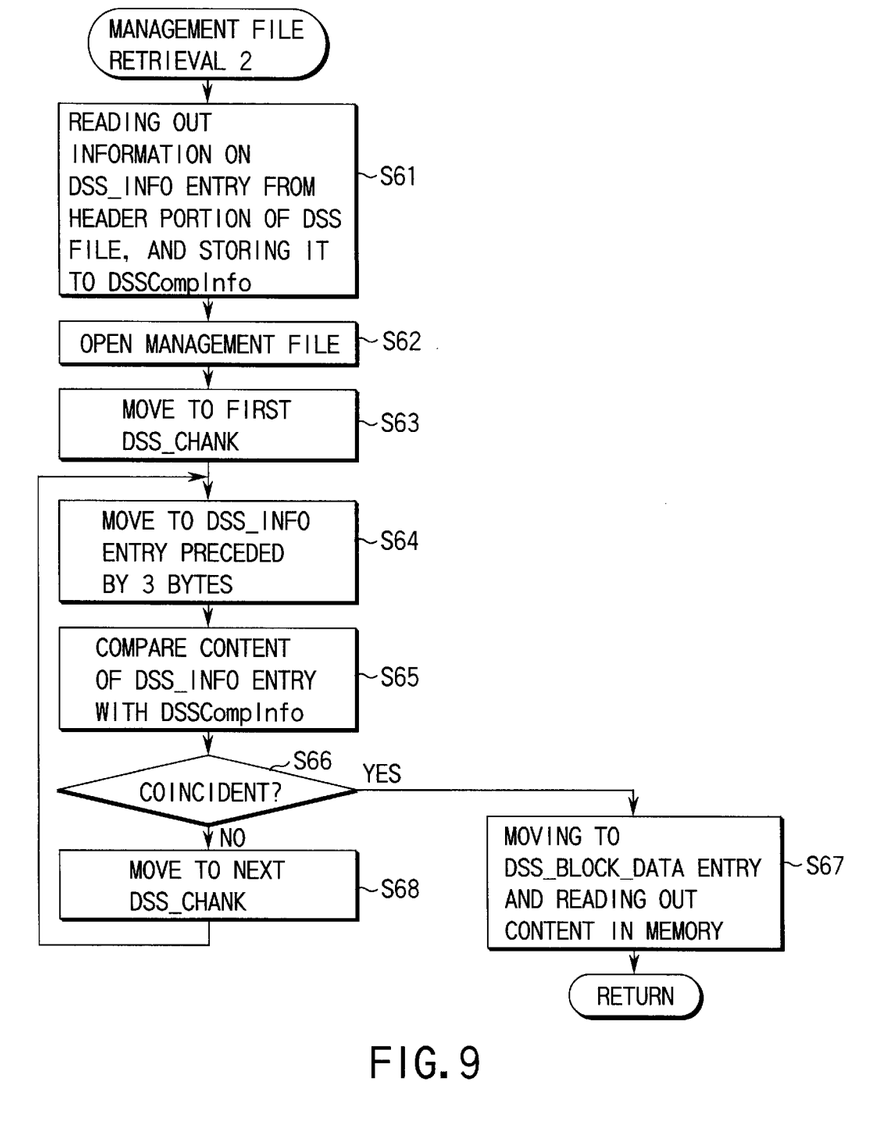
FIG. 9 is a flowchart for illustrating the details on management file retrieval (No. 2) processing shown in FIG. 8A.

That is, in this management file retrieval (No. 2) processing, as shown in FIG. 9, the information on DSS-CompInfo corresponding to the information on the DSS_INFO entry of the management file 111 is first read out from the header portion of the DSS file. Then, the information is stored in the variable register DSSCompInfo provided in the control device 104 or RAM 106 (step S61). Then, the management file 111 configured in the RAM 106 or storage medium 107 is opened (step S62), and the internal address pointer indicative of the processing target of the control device 104 is moved to the DSS_CHANK entry of the DSS file of registry No. 1 in the management file 111 (step S63). Still furthermore, the internal address pointer is moved to the DSS_INFO entry preceded by three bytes (step S64), and the content of the DSS_INFO entry are compared with the content of the variable register DSSCompInfo (step S65). When these contents are coincident with each other (step S66), the pointer moves to the corresponding DSS_BLOCK_DATA entry of the management file 111. Then, the time for each block is read out, and stored in a temporary storage area provided in the control device 104 or RAM 106 (step S67), and the processing returns to the high-order routine.

In addition, in the case where these contents are not coincident with each other, the internal address pointer moves to the next DSS_CHANK entry (step S68). Then, the processing returns to step S64, whereby comparison with the management information on the DSS file of the next registry No. will be performed. In this management file retrieval (No. 2) processing, there must be present corresponding DSS_BLOCK_DATA entry.

Thus, if the time for each block is stored in the temporary storage area, the control device 104 then initializes the internal counter "i" (not shown) as "1" (step S44). Thereafter, in the times for the temporarily stored blocks, the i-th block indicated by the internal counter "i", namely, time for block (i) and the skip time position instructed to be changed are compared with each other. If the former time is greater than the latter time (step S45), the value of the internal counter "i" is updated by "+1" (step S46), and the comparison is performed again.

Thus, if the time for block (i) is greater than the SKIP time position, it is judged whether or not the value of the internal counter "i" is "1" (step S47). Otherwise, "0" is set to the time position register BlockData provided in the control device 104 or RAM 106 (step S48). The time position when this BlockData is 0 denotes the beginning of block 1 as shown in FIG. 3A. That is, when the value of the internal counter "i" is "1", the SKIP time position is present in block 1. The value of BlockData is set so as to indicate the beginning of the block 1.

In addition, in step S47, when it is judged that the value of the internal counter "i" is not "1", Block (i-1) is stored in the time position register BlockData=(step S49). For example, when the SKIP time position is present in block 2, the value of the internal counter "i" is "2". Thus, (i-1), namely (2-1) is performed so as to indicate the time for block 1 being the beginning time for the block 2, and BlockData=Block 1 is obtained.

As described above, in the case where the management information corresponding to the DSS file is retrieved from a management file, it is judged whether or not the content of DSSCompInfo read out from the header portion of the DSS file coincides with the content of DSS_INFO entry of the management file. Namely, a file name of the DSS file has nothing to do with management file retrieval. Thus, even if the user or someone has changed a file name of the DSS file, there is no problem in management information retrieval from the management file.

Thus, when a time position is stored in the time position register BlockData, it is judged as to what is the value of BlockData, and the processing jumps to the SKIP time position.

That is, when the value of the time position register BlockData is 0, it denotes that the SKIP time position is equal to or less than the time for block 1. In this case (step S50), the SKIP time position is calculated sequentially from the sector header SH of the first sector of block 1, and the processing jumps therefrom (step S51). Namely, the time for the sector is calculated according to the number NF of frames×24 ms or 30 ms in order from the sector header SH of the first sector of block 1. Then, the time is obtained by accumulating the calculations sequentially. This accumulation is repeated until the processing has reached the SKIP time position. When it has reached the SKIP time position, the sector is assumed as a position to be played back, and the data on the sector is read out and played back.

In addition, when the value of the time position register BlockData is equal to the time for block 1, the SKIP time position is equal to or smaller than that for block 2. In this case (step S52), the processing pointer is moved to the first sector of block 2 (step S53), the skip time positions are sequentially calculated from the sector header SH of that sector, and the processing jumps therefrom (step S54). Namely, the times for the sectors are calculated sequentially from the sector header SH of the first sector of block 2 by the number NF of frames×24 ms or 30 ms. The time is obtained by accumulating the calculations sequentially. This accumulation is repeated until the processing has reached the SKIP time position. When it has reached the SKIP time position, the sector is assumed as a position to be played back, and the data on the sector is read out and played back.

Hereinafter, similarly, when the value of the time position register BlockData is equal to the time for block (n−2) (provided if the number of blocks is assumed to be 'n') (step S55), the processing pointer is moved to the first sector of block (n−1) (step S56). Then, the SKIP time positions are calculated sequentially from the sector header SH of the sector, and the processing jumps therefrom (step S57). In contrast, in step S55, when it is not judged that the value of the time position register BlockData is not block (n−2), the processing pointer is moved to the first sector of block (n) (step S58). Then, the SKIP time positions are calculated sequentially from the sector header SH of the sector, and the processing jumps therefrom (step S59).

Namely, the processing in steps S50 to S59 corresponds to the above calculating means.

Second Embodiment

Although the first embodiment is provided as an example when a DSS file is played back on the PC 100 side, the present invention is applicable to a simplex of the voice recording/playing back device 10. Hereinafter, a second embodiment of the present invention will be described by way of showing the above example.

In the present embodiment, unlike the first embodiment, a description will be given assuming that a management file for only the specified DSS file to be played back is created instead of creating management files for all the DSS files. Of course, as in the first embodiment, all the DSS files may be created. In addition, even in the PC side processing as shown in the first embodiment, like the second embodiment, only the specified DSS file may be created.

Figure 10:
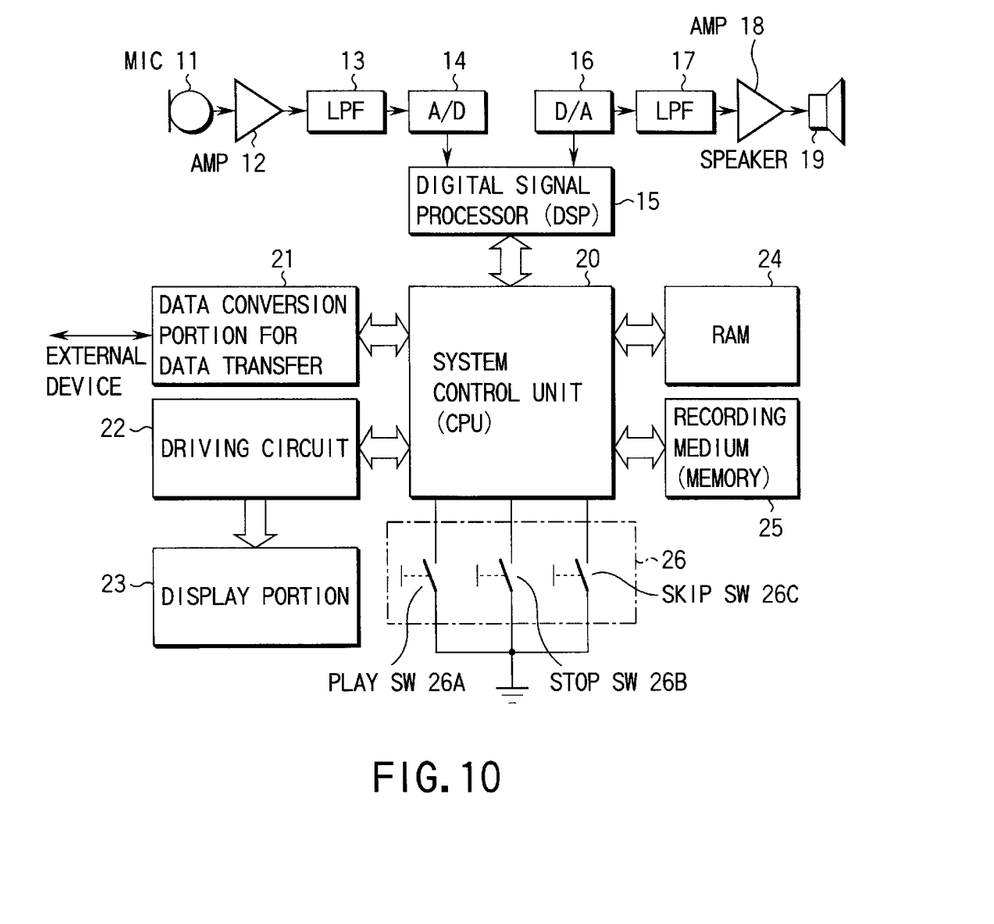
FIG. 10 is a block diagram showing a configuration of a voice recording/playing back device to which a playback apparatus according to a second embodiment of the present invention is applied.

FIG. 10 is a diagram showing a configuration of the voice recording/playing back device 10 to which the playback apparatus according to the second embodiment of the present invention is applied.

That is, a microphone (MIC) 11 is connected to a digital signal processor (DSP) 15 via an AMP 12, a low pass filter (LPF) 13, and an analog/digital converter (A/D) 14. A speaker 19 is connected to this DSP 15 via the D/A 16. LPF 17, and AMP 18.

In addition, this DSP 15 is also connected to a system control unit (CPU) 20. To the CPU 20, there are connected a data-transfer data converting portion 21 for transferring data between the CPU and an external device such as PC 100; a driving circuit 22 for driving a display portion 23; a RAM 24 for storing a management file; and a recording medium 25 for storing DSS files. The recording medium 25 may be incorporated in the voice recording/playing back device 10 or may be detachable from the voice recording/playing back device 10.

Further, an operational input portion 26 with various operation buttons is connected to CPU 20. In FIG. 10, there is shown only a playback button (PLAY SW) 26A, a stop button (STOP SW) 26B, and a skip button (SKIP SW) 26C required for illustrating an operation of the present embodiment. The skip button 26C corresponds to the above access operation means. For example, the playback time position is updated by 5 seconds every time the button is operated to be pressed down or continuously by 10 seconds if the button is held down. Alternatively, when the button is held down, a construction may be provided such that the stepwise skipping time is changed by 100 seconds until 1 minute has elapsed; 30 seconds from 1 minute to 10 minutes; and 5 minutes after 10 minutes.

Hereinafter, a general recording and playing back operation of the voice recording/playing back device 10 with such construction will be described. When the operator presses a recording button (not shown), recording mode is obtained. After the voice input from the microphone 11 has been converted into an electric signal, the converted signal is amplified by the AMP 12. Then, an unnecessary component of the signal is eliminated from the LPF 13. Thereafter, the signal is converted into a digital signal by means of the A/D 14 to be input to the DSP 15. In this DSP 15, after compression processing has been applied to the digital voice signal, the voice data is recorded in the recording medium 25 under the control of CPU 20.

In addition, when the operator presses a playback button 26A, playback mode is obtained. After the voice data has been read out from the recording medium 25 under the control of CPU 20, expansion processing is applied in the DSP 15. The thus expanded voice signal is converted into an analog signal by means of the D/A 16, an unnecessary component of the signal is eliminated by means of the LPF 17. The signal is amplified by the AMP 18, and is output as a voice from the speaker 19.

In the case where the stop button 26B is pressed during recording or playing back operation of the above voice, the operation is stopped. In addition, a variety of information is displayed on the display portion 23 according to mode selection.

Figure 11:
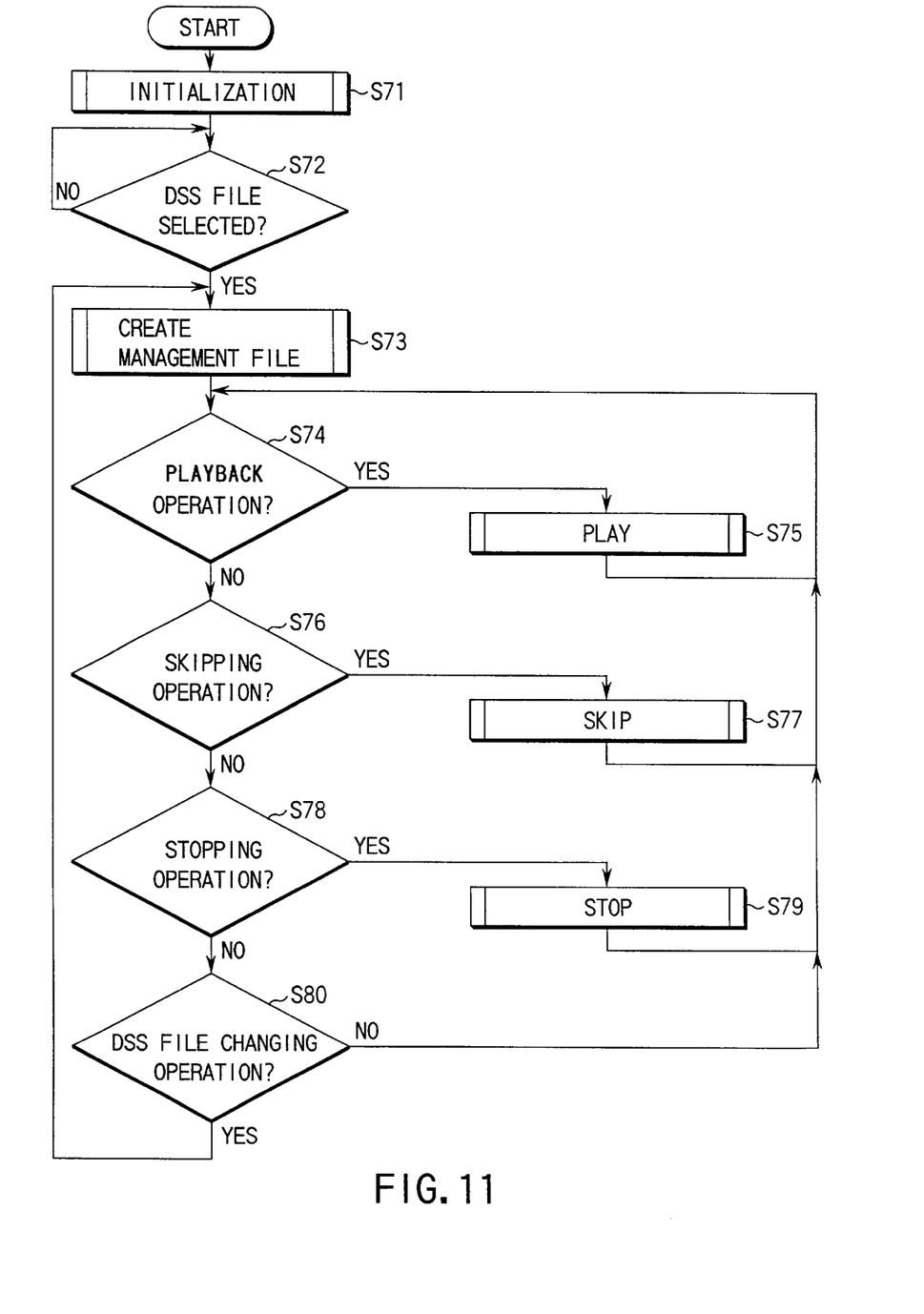
FIG. 11 is a flowchart showing a main operation of CPU for a voice recording/playing back device for illustrating an operation of the second embodiment.

FIG. 11 is a flowchart showing a main operation of the CPU 20 of such voice recording/playing back device 10.

That is, the operation shown in this flowchart is started by battery charging. First, initialization of each portion is performed (step S71). This initialization includes status detection of each button or power control; clearing an internal memory (not shown) in the CPU 20 or RAM 24; and displaying specific information (for example, file name) for identifying a DSS file on the display portion 23.

Thereafter, the apparatus waits until a DSS file to be played back is selected (step S72). When the file is selected, management file creation processing is performed, and a management file is created in the RAM 24 (step S73). This management file includes entry similar to that shown in the first embodiment, but relates to one DSS file, namely, the selected DSS file. This management file creation processing will be described later in detail.

After the management file has been created, if the playing back button 26A is operated to be pushed down (step S74), playback processing of the selected DSS file (PLAY processing) is performed (step S75). In addition, when the skip button 26C is operated to be pushed down (step S76), skip processing (SKIP processing) is performed. Then, a voice at the specified SKIP time position is played back (step S77). When the stop button 26B is operated to be pushed down (step S78), stop processing (STOP processing) is performed, and voice playback is stopped (step S79). Although not shown in particular, in the case where skipping operation is performed during the PLAY processing, SKIP processing similar to that shown in step S77 is executed. In addition, when another DSS file is selected by operation of a select button (not shown) or the like (step S80), the processing returns to step S73. Then, a management file of the newly selected DSS file will be created.

Figure 12:
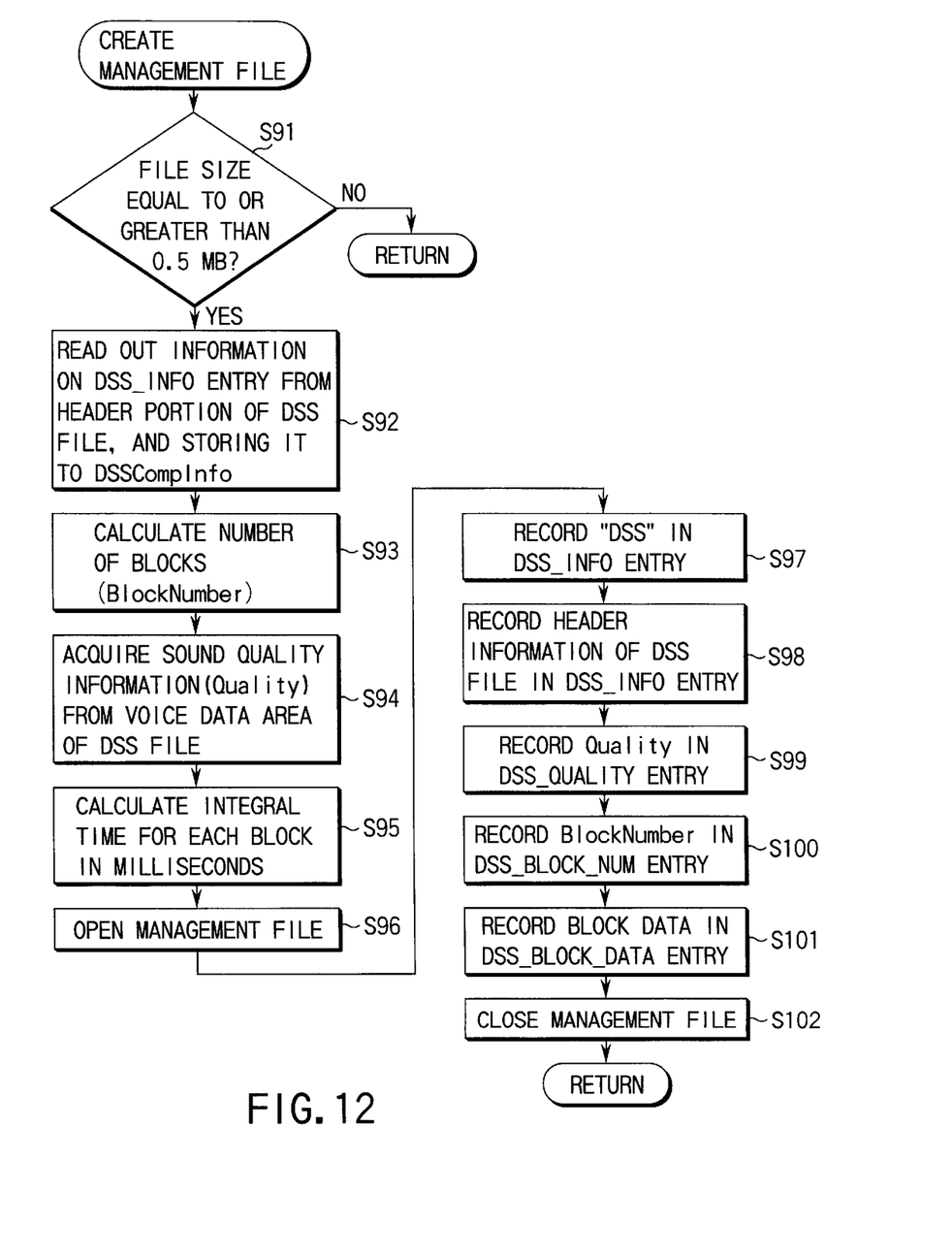
FIG. 12 is a flowchart for illustrating the details on management file creation processing shown in FIG. 11.

FIG. 12 is a flowchart showing management file creation processing executed in step S73.

That is, it is first judged whether or not the file size of the DSS file selected in step S72 is equal to or greater than 0.5 MB, i.e., whether or not the file size consists of a plurality of blocks (step S91). If the file size is smaller than 0.5 MB, there is no need for creating a management file. Thus, the management file creation processing is terminated, and the processing returns to a main operation flowchart.

In contrast, in the case where a file size is equal to or greater than 0.5 MB, the information on DSSCompInfo corresponding to the information on DSS_INFO entry of the management file is read out from the header portion of the DSS file. The information is then stored in the variable register DSSCompInfo (not shown) configured in the CPU 20 or RAM 24 (step S92).

Thereafter, the number of blocks configuring the DSS file is calculated, and the calculation result is stored in the variable register BlockNumber (not shown) configured in the CPU 20 or RAM 24 (step S93).

Next, the sound quality information is acquired from the voice data area for the DSS file, namely, from each sector header SH. Then, the information indicating that the DSS file is active in any one of the standard mode, long mode, and their coexisting mode is stored in the variable register Quality (not shown) configured in the CPU 20 or RAM 24.

The time for each block is calculated in milliseconds according to the information of each of the sector headers SH, and the result is stored in the variable register (not shown) configured in the CPU 20 or RAM 24 (step S95).

Then, a management file is opened (step S96); a character string "DSS" is recorded in the DSS_CHANK entry (step S97), and then, the information stored in the variable register DSSCompInfo is recorded in the DSS_INFO entry (step S98). Thereafter, the content of the variable register Quality is recorded in the DSS_QUALITY entry (step S99). In addition, the content of the variable register BlockNumber is recorded in DSS_BLOCK_NUM (step S100). Further, the time for each block calculated and stored in step S95 is recorded in the DSS_BLOCK_DATA entry (step S101).

This management file is closed (step S102), and the management file creation processing is terminated.

In addition, the SKIP processing executed in step S77 is similar to that on the PC 100 side in the first embodiment except that there is no management file retrieval (No. 2) processing in step S43, and thus, an illustration thereof is omitted here.

Additional advantages and modifications will readily occur to those skilled in the art. Therefore, the invention in its broader aspects is not limited to the specific details, representative devices, and illustrated examples shown and described herein. Accordingly, various modifications may be made without the spirit or scope of the general inventive concept as defined by the appended claims and their equivalents.

What is claimed is:

1. A playback apparatus for playing back a voice data file, wherein the voice data file comprises a plurality of blocks and a file header being management information on the voice data file, the blocks each contain a plurality of sectors and a block header being management information on the block, and the sectors contain voice data and a sector header being management information on the sector, the apparatus comprising:
   calculation means for calculating a playback position from a start position of the voice data file by each block;
   management file creation means for creating a management file for managing a playback position from a start position of the voice data file of each block; and
   storage means for storing the management file.

2. The apparatus according to claim 1, further comprising:
   playback position specifying means for specifying an arbitrary playback position of the voice file; and
   playback position moving means for referring to the management file, thereby moving the playback position to the specified arbitrary playback position.

3. The apparatus according to claim 2, wherein said playback position moving means compares the specified arbitrary playback position with the playback position of the start position of the voice file of each block in the management file, thereby retrieving a block having the specified arbitrary position contained therein.

4. The apparatus according to claim 3, wherein said playback position moving means calculates playback positions sequentially from a first sector of the retrieved block having the arbitrary playback position contained therein, thereby retrieving a sector having the specified playback position contained therein.

5. The apparatus according to claim 2, further comprising:
   file size judging means for judging whether or not the file is greater than a predetermined value,
   wherein said playback position moving means refers to the management file, thereby moving a playback position to the specified arbitrary playback position in the case where the voice file size is judged to be greater than the predetermined value in said file size judging means.

6. The apparatus according to claim 5, wherein said playback position moving means calculates the specified arbitrary playback position based on the sector header by each block, and moves the playback position in the case where the voice file size is judged to be smaller than a predetermined value in said file size judging means.

7. The apparatus according to claim 1, further comprising:
   playback voice file selecting means for selecting a voice file to be played back,
   wherein said calculating means calculates the playback position of each block from the start position of the voice file only selected by said playback file selecting means.

8. The apparatus according to claim 1, further comprising:

file size judging means for judging whether or not the voice file size is greater than a predetermined value, wherein said calculating means calculates the playback position of each block from the start position of the voice file only in the case where the voice file size is judged to be greater than a predetermined value by said file size judging means.

9. A recording medium having a playback program for playing back a voice data file recorded therein, the voice data file containing a plurality of blocks and a file header being management information on the voice data file, the blocks each containing a plurality of sectors and a block header being management information on the block, the sectors each containing voice data and a sector header being management information of the sector, the playback program causing a computer to perform operations for:

calculating the playback position from the start position of the voice data file by each block;

creating a management file for managing the playback time from the start position of the voice file of each block; and storing the management file in a storage medium for storing voice data.

10. The medium according to claim 9, wherein the playback program further causes a computer to perform operations for:

causing the user to specify an arbitrary playback position in the voice file; and referring to the management file, thereby moving the playback position to the specified arbitrary playback position.

11. The medium according to claim 10, wherein the playback program further causes a computer to perform operations for:

comparing the specified arbitrary playback position with the playback position from the start position of the voice file for each block in the management file, thereby retrieving a block having the specified arbitrary position contained therein.

12. The medium according to claim 11, wherein the playback program further causes a computer to perform operations for:

calculating playback positions sequentially from the first sector of the retrieved block having the arbitrary playback position contained therein, thereby retrieving a sector having the specified arbitrary playback position contained therein.

13. The medium according to claim 10, wherein the playback program further causes a computer to perform operations for:

judging whether or not the voice file is greater than a predetermined value; and referring to the management file, thereby moving a playback position to the specified arbitrary playback position in the case where the voice file size is greater than a predetermined value.

14. The medium according to claim 10, wherein the playback program further causes a computer to perform operations for:

judging whether or not the voice file is greater than a predetermined value in size; and calculating the specified arbitrary playback position based on the sector header by each block, thereby moving the playback position in the case where the voice file size is smaller than a predetermined value.

15. The medium according to claim 9, wherein the playback program further causes a computer to perform operations for:

causing the user to select a voice file to be played back; and calculating the playback position of each block from the start position of the selected voice file only.

16. The medium according to claim 9, wherein the playback program further causes a computer to perform operations for:

judging whether or not the voice file size is greater than a predetermined value; and calculating the playback position of each block from the start position of the voice file in the case where the voice file size is greater than a predetermined value.

17. A method for playing back a playback apparatus for playing back a voice data file, the voice data file containing a plurality of blocks and a file header being management information on the voice data file, the blocks each containing a plurality of sectors and a block header being management information on the block; the sectors each containing voice data and a sector header being management information on the sector, the method comprising the steps of:

calculating the playback position from the start position of the voice data file by each block;

creating a management file for managing the playback position from the start position of the voice data file in each block; and storing the management file in a storage medium for storing voice data.

18. The method according to claim 17, further comprising the steps of:

causing the user to specify an arbitrary playback position in the voice file; and referring to the management file, thereby moving a playback position to the specified arbitrary playback position.

* * * * *